March 25, 1924.

W. S. JOHNSON

SAFETY APPARATUS

Filed July 21, 1923    2 Sheets-Sheet 1

1,488,396

Wilfred S. Johnson, INVENTOR

BY Victor J. Evans ATTORNEY

WITNESS

March 25, 1924.
W. S. JOHNSON
SAFETY APPARATUS
Filed July 21, 1923    2 Sheets-Sheet 2
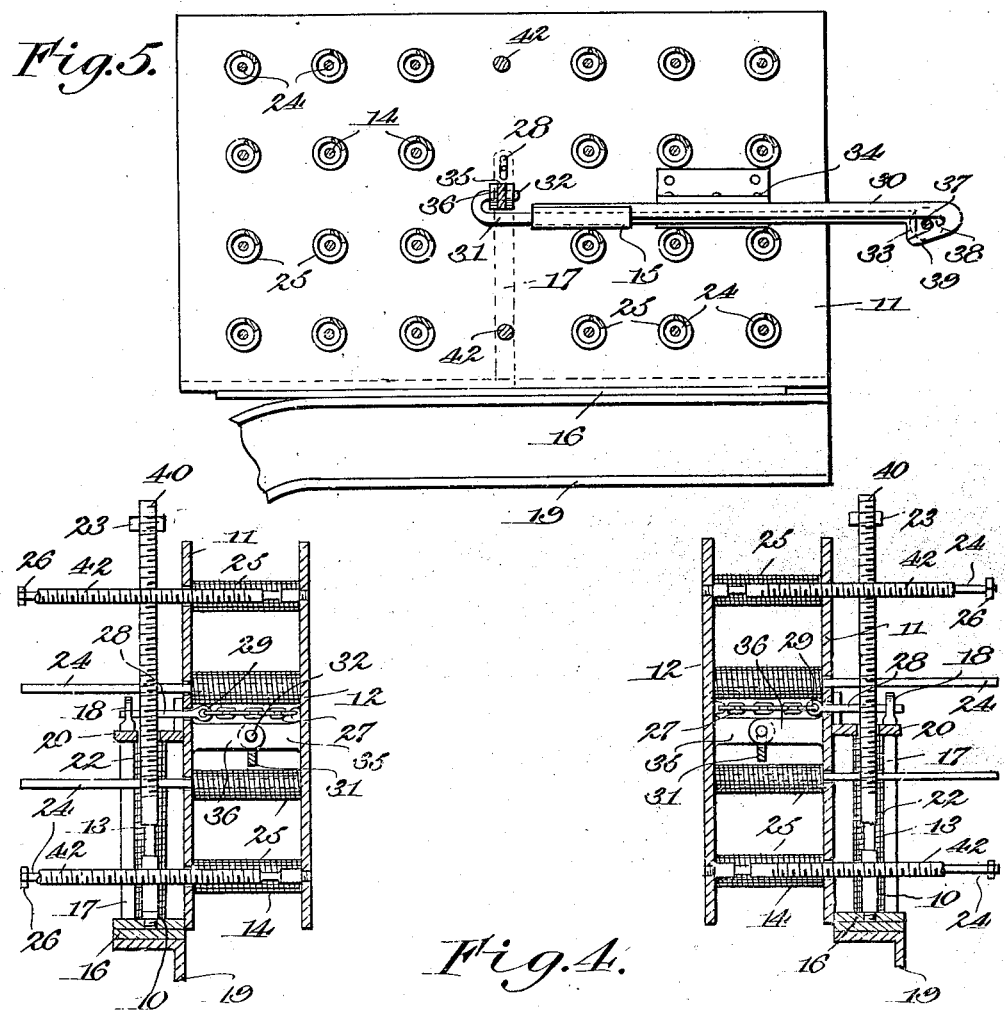
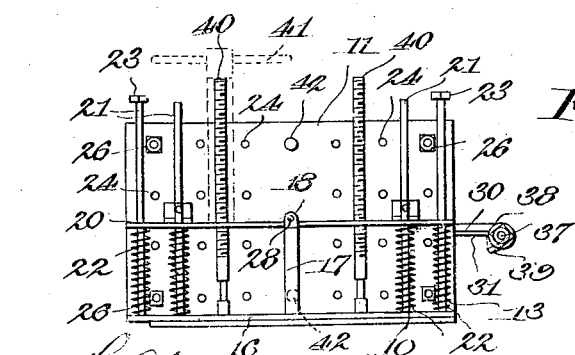
Wilfred S. Johnson,
INVENTOR
BY Victor J. Evans
ATTORNEY Patented Mar. 25, 1924.

1,488,396

UNITED STATES PATENT OFFICE.

WILFRED S. JOHNSON, OF NEW YORK, N. Y.

SAFETY APPARATUS.

Application filed July 21, 1923. Serial No. 653,051.

*To all whom it may concern:*

Be it known that I, WILFRED S. JOHNSON, a citizen of Great Britain, residing at 151 W. 142nd St., New York city, in the county of New York and State of New York, have invented new and useful Improvements in Safety Apparatus, of which the following is a specification.

This invention relates to safety apparatuses.

More particularly the invention relates to safety apparatuses such as are employed on vehicles for saving life.

Some of the objects of the present invention are: to equip a vehicle such as an automobile with an apparatus which clamps and lifts a person encountered by the apparatus; to produce a safety clamping and lifting apparatus for a vehicle which is efficient in construction and effectual and reliable in use. With these and other objects in view the invention resides in the combination of elements, particular provision, relative disposition and functions of the parts hereinafter fully described and illustrated in the accompanying drawings, in which:

Figure 4 is a sectional view taken on the line 4—4, Figure 3.

Figure 5 is a sectional view taken on the line 5—5, Figure 3, and drawn on an enlarged scale.

Figure 6 is a side elevation.

Figure 1:
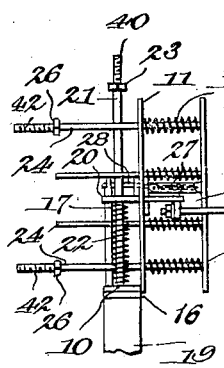
Figure 1 is a front view of the apparatus in place on the front portions of the running gear of a vehicle; the apparatus being shown in an inactive condition.
Figure 2:
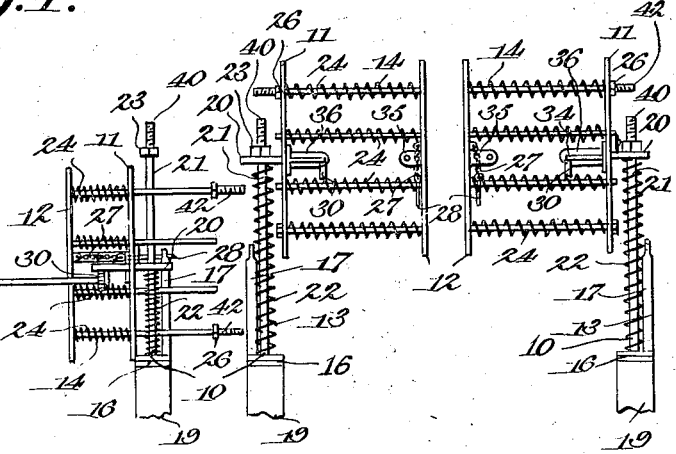
Figure 2 is a view similar to the view shown in Figure 1, but showing the apparatus in an active condition.
Figure 3:
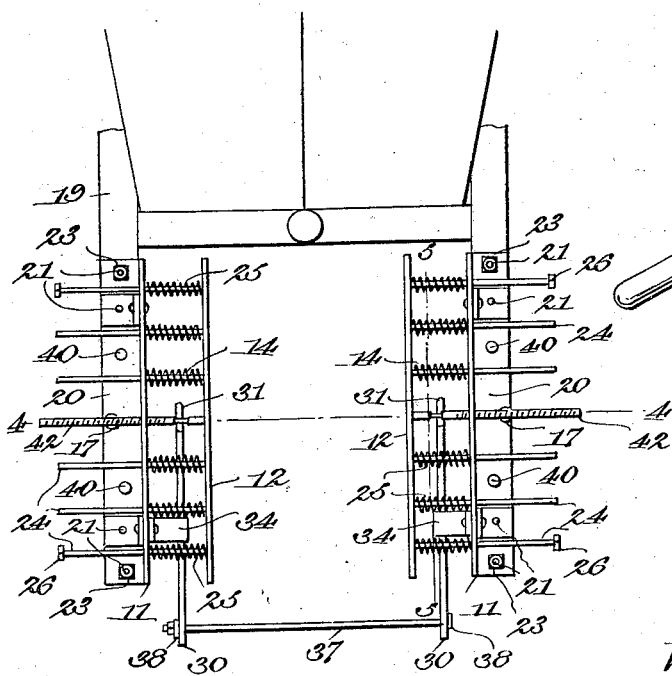
Figure 3 is a plan view.

In order to carry out the result looked for which is to clamp and lift a person on foot instead of running over such person with a vehicle, a vehicle is equipped with an apparatus at the front end thereof for the mentioned purpose. The apparatus mentioned is therefore a safety apparatus and is primarily intended for use upon an automobile and is preferably supported by portions of the running gear of the automobile in any suitable manner either by providing special accessories or by specially constructing the running gear. In the present instance the apparatus is supported by brackets attached to the front axle of the vehicle.

Generally the apparatus comprises fixtures 10, supports 11, cooperative elements 12, compression and expansion means 13 behind each of the supports 11, compression and expansion means 14 behind each of the elements 12, and releasing means 15 for holding said supports and said elements against movement, and upon the actuation thereof, to allow the movement of said supports and said elements; and means for setting the supports 11 and the elements 12 by compressing the means 13 and 14.

Figure 7:
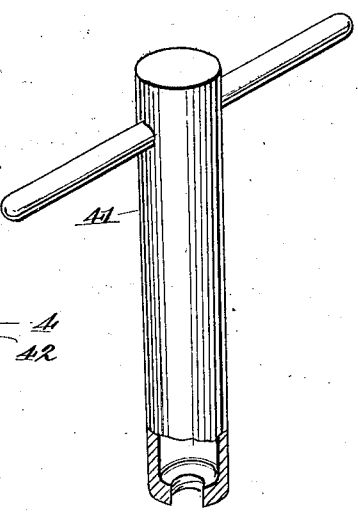
Figure 7 is a sectional perspective view of the key used for compressing the compression and expansion means of the apparatus.

Specifically the constituents mentioned above are constructed, arranged, and operate as presently described. Two fixtures 10 are employed and each comprises attaching means 16 and a post 17 arranged vertically thereon mid-way of its length and having an eye 18. The fixtures 10 are carried respectively by portions 19 of the running gear of the vehicle. Two supports 11 are employed and each is in the nature of a plate having a member 20. One support 11 is movably carried by each of said fixtures 10 by the means 13 parts of which also serve to effect the movement of the support 11. The means 13 comprises rods 21 which are attached to the means 16 and are vertically disposed and extend through the member 20 by virtue of holes therein; and springs 22 encircle the rods 21 respectively between the member 20 and the means 16. Two of the rods have heads or nuts 23 to limit the upward movement of the support. Two elements 12 are employed and each is substantially similar to the support with the exception of the member 20. One element 12 is movably supported by each of the supports 11 by a means 14 hereinbefore mentioned parts of which also serves to effect the movement of the element 12. The means 14 comprises rods 24 which are attached to the element 12 and extend through the support 11 by virtue of holes therein; and springs 25 encircle the rods 24 respectively between the element 12 and the support 11. Some of the rods 24 have a head or nut 26 to limit the movement of the element 12. The releasing means 15 which serves to hold the supports 11 and the elements 12 in inactive positions with the compression and expansion means compressed, and which when actuated allow said compression and expansion means to effect the movement of the supports 11 and the elements 12, includes a pair of chains 27 each of which has a pin or bolt 28, there being one chain 27 attached to each element 12 as at 29, and the bolt 28 thereof which is at the free end of the chain is capable of being extended through the support 11 which carries the element by virtue of a hole therein as shown in Figure 5. The means 15 also includes members 30 each of which carries a locking-bolt 31 having an extension 32 with an angular extremity 33, there being one member 30 carried by each support 11 by virtue of attaching means 34. Each element 12 has an apertured lug 35, and each support 11 has an apertured lug 36 and the said lugs are capable of being brought to positions in which the apertures therein aline for the reception of the locking-bolt 31 which is slidably mounted on its member 30 so that said locking-bolt may be into and out of said alined apertures of the lugs 35 and 36. The locking-bolts 31 when disposed respectively in the apertures in the lugs 35 and 36 serve to hold the element 12 against movement; the springs 25 compressed for action; and incidentally allows the employment of the bolts 28 carried by the chains 27 to be inserted respectively in the eyes 18 of the posts 17. The posts 17 each in the inactive position of the support 11 related thereto extend through the member 20 thereon by virtue of a hole in the latter. The means 15 also includes a releasable contact bar 37 having collars 38 near the opposite ends thereof respectively. The bar 37 is held in place against the extremities 33 by virtue of hooks 39 of the members 30 so that upon the application of pressure against the bar the locking-bolts 31 will be moved for the releasing operation. In order to compress the means 13 and 14 there is provided the means hereinbefore mentioned and referred to as the setting means. This means includes a screw 40 attached to a portion of the means 16 of each fixture 10 and a key 41 such as is shown in Figure 7. Each screw 40 extends through a hole in the member 20 as shown in Figure 5. The key 41 which has screw threads which coact with the screw threads of the screw 40, may be screwed down on the screw 40 against the member 20 and in that way the springs 22 may be compressed and the application of the bolts 28 in the eyes 18. The setting means also includes screws 42 two of which may be connected to each element 12 to be extended through holes therefor in the support 11. A key 41 is applied to each screw 42 and screwed thereon against the support 11 to draw the element 12 towards the support until the lugs 35 and 36 meet with their apertures alined, whereupon the locking-bolt 31 may be projected into said alined apertures. The screws 40 and 42 may be removed after the supports 11 and the element 12 are set for action.

In practice the operation of the apparatus is as follows: A person in the path of travel of the vehicle on which the apparatus is mounted, when encountered by the bar 37 will bring sufficient pressure to bear against the bar as to cause the same to push on the extremities 33 to disengage the locking-bolts 31 from the lugs 35 and 36, and at the same time the bar will drop out of the way. The disengagement of the locking-bolts 31 allows the springs 25 to come into play with the result that the elements 12 will move towards each other. The movement of the elements 12 also results in the disengagement of the bolts 28 from the eyes 18, and as a consequence the springs 22 come into play and move the supports 11 upwardly. It should now be manifest that by reason of the fact that the vehicle is still moving forwardly at the time the elements 12 are moving towards each other, the person will be clamped between said elements, and will be lifted immediately, because of the upward movement of the supports 11 which carry said elements 12. By this time the vehicle has been stopped and the person may be disengaged, saved perhaps from being killed.

What is claimed is:

1. For a vehicle, a safety apparatus comprising opposed elements, springs which exert themselves against said elements to effect the movement thereof toward each other, releasing means for maintaining said elements in inactive positions and operable to allow said elements to be acted upon by said operating means, and means for compressing said springs.

2. For a vehicle, a safety apparatus comprising opposed elements, operating means for effecting the compound movement of said elements, and releasing means for maintaining said elements in inactive positions and operable to allow said elements to be acted upon by said operating means to be moved thereby to active positions, said releasing means including locking bolts each having an extension, and a releasable contact bar releasably supported to act against said extensions.

3. On a vehicle, a safety apparatus comprising fixtures each having attaching means, a support movably carried by each of said fixtures, an element movably carried by each of said supports, said elements being arranged opposite each other, compression and expansion means arranged between each of said supports and the element carried thereby allowing each element to assume different positions and to be moved thereby, and releasable means which coacts with a portion of each support and a portion of the element carried thereby for holding the compression and expansion means therebetween compressed and for holding the element against movement, and means for compressing said compression and expansion means.

4. On a vehicle, a safety apparatus comprising fixtures each having attaching means, a support movably carried by each of said fixtures, an element movably carried by each of said supports, said elements being arranged opposite each other, compression and expansion means arranged between each fixture and the support carried thereby, compression and expansion means arranged between each support and the element carried thereby, and releasable means which coacts with a portion of each support and the element carried thereby for holding the compression and expansion means therebetween compressed and for holding the element against movement, the compression and expansion means being operable to move said supports and elements respectively upon the release of said releasable means.

5. On a vehicle, a safety apparatus comprising movably supported elements, compression and expansion means behind each of said elements to effect the movement of each element when released, means for compressing said first means, and means for releasing said elements.

6. On a vehicle, a safety apparatus comprising movably supported elements, compression and expansion means behind each of said elements to effect the movement of each element when released, means for compressing said first means, and means for releasing said elements simultaneously.

7. Safety apparatus comprising movably mounted supports, compression and expansion means behind each of said supports to effect the movement of said supports when released, means for compressing said first means, an element movably supported by each of said supports, compression and expansion means behind each of said elements, means for compressing said last mentioned compression and expansion means the latter serving to effect the movement of the element behind which it is arranged, and means for releasing said supports and said elements.

8. A safety apparatus for vehicles comprising fixtures each having attaching means, a support movably carried by each of said fixtures, an element movably carried by each of said supports, said elements being arranged horizontally opposite each other, compression and expansion means arranged between each support and the element carried thereby, compression and expansion means arranged between said fixture and the support carried thereby, and releasable means for holding both of said compression and expansible means compressed and against movement, both of said compression and expansion means being operable to simultaneously move said supports and elements respectively upon the release of said releasable means.

In testimony whereof I hereby affix my signature.

WILFRED S. JOHNSON.